United States Patent [19]

Plass

[11] 4,145,398
[45] Mar. 20, 1979

[54] BAUXITE DIGESTION BY CAUSTIC ALKALI WITH IMPROVED HEAT TRANSFER IN TUBULAR REACTORS

[75] Inventor: Ludolf Plass, Kronberg, Taunus, Fed. Rep. of Germany

[73] Assignee: Vereinigte Aluminium-Werke A.G., Bonn, Fed. Rep. of Germany

[21] Appl. No.: 754,749

[22] Filed: Dec. 27, 1976

Related U.S. Application Data

[62] Division of Ser. No. 443,870, Feb. 19, 1974, abandoned.

[51] Int. Cl.² ............................................. C01F 7/06
[52] U.S. Cl. ...................................... 423/121; 165/1; 165/DIG. 5
[58] Field of Search .................. 423/121, 119; 165/1, 165/DIG. 5

[56] References Cited

U.S. PATENT DOCUMENTS

| | | | |
|---|---|---|---|
| 2,992,893 | 7/1961 | Soudan et al. | 423/121 |
| 3,579,294 | 5/1971 | Tamise et al. | 423/121 |
| 3,723,073 | 3/1973 | Conti | 423/121 |

*Primary Examiner*—Charles J. Myhre
*Assistant Examiner*—Margaret LaTulip
*Attorney, Agent, or Firm*—Darby & Darby

[57] ABSTRACT

A first substance and a liquid are conveyed along a conduit at least part of which is arranged in heat-exchange relationship with a second substance. Upstream of this part of the conduit, a suspension of the first substance in the liquid is formed wherein the first substance has an average particle size between 10 and 150 microns and a concentration between 1 and 6 volume percent. The suspension is conveyed along the conduit under conditions of turbulent flow. In this manner, the efficiency of the heat-exchange between the suspension and the second substance is increased. The method may be used to increase the heat-exchange efficiency in the extraction of bauxite so that an apparatus of given size can extract greater quantities of bauxite or, conversely, so that a given quantity of bauxite can be extracted with an apparatus of smaller size.

4 Claims, 1 Drawing Figure

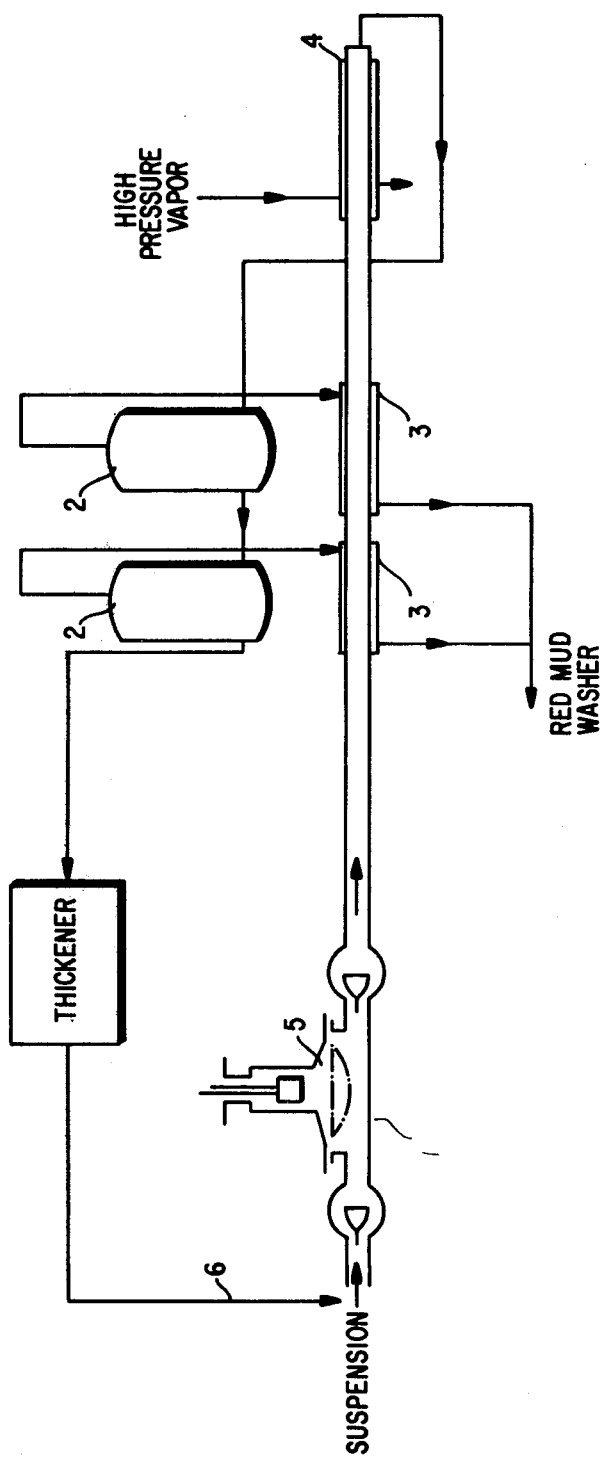

BAUXITE DIGESTION BY CAUSTIC ALKALI WITH IMPROVED HEAT TRANSFER IN TUBULAR REACTORS

This is a division of application Ser. No. 443,870, filed Feb. 19, 1974, now abandoned.

BACKGROUND OF THE INVENTION

The invention relates generally to heat-exchange and, more particularly, to increasing heat-exchange efficiency. Still more specifically, the invention relates to the improvement of the heat-exchange between a flowing fluid and a substance at a different temperature. Of special, although not exclusive, interest, in an increase in the heat-exchange efficiency for the extraction of bauxite where the extraction is at least partially accomplished in a tubular reactor.

For the purpose of providing a basis for an understanding of the invention, an exemplary process wherein improvements in the efficiency of heat-exchange is desirable will be briefly described. Thus, in a known process for the continuous extraction of bauxite, bauxite and caustic soda or lye are conveyed along a tubular conduit under pressure. Portions of the conduit are surrounded by annular members arranged in heat-exchange relationship with the conduit and a heated fluid is conveyed through the annular members in a direction opposite to the direction of flow of the bauxite and lye in the conduit. The temperature of the heated fluid in the annular member nearest the point where the bauxite and lye are introduced into the conduit is lower than that of the heated fluid in the succeeding annular members and, in general, the temperature of the heated fluid increases with increasing distance from the point at which the bauxite and lye are introduced into the conduit. As a result, the bauxite and lye flowing through the conduit are progressively heated by heat-exchange with the heated fluid until the decomposition temperature of the bauxite is attained. In practice, this process has been found to yield very good results.

However, as will be clear, one of the important factors which determines the size and, hence, the cost, of an apparatus for the extraction of bauxite in this manner is the size or extent of the surfaces over which heat-exchange occurs. This, of course, is also true for other types of processes and apparatus utilizing heat-exchange. Thus, it is evidently desirable to increase the efficiency of heat-exchange for processes of the type under consideration.

SUMMARY OF THE INVENTION

It is, accordingly, a general object of the invention to provide a procedure for increasing the efficiency of heat-exchange.

More particularly, it is an object of the invention to provide a procedure for increasing the efficiency of heat-exchange between a flowing fluid and a substance at a different temperature.

Another object of the invention is to provide such a procedure which may be performed simply and economically.

A concomitant object of the invention is to provide an improved process for the extraction of bauxite.

An additional object of the invention is to provide an improved process for the continuous extraction of bauxite with caustic liquor.

These and other objects are realized by the procedure set forth by the invention. Briefly, a first substance and a liquid are conveyed along a predetermined path including a zone arranged for heat-exchange relationship with a second substance. Upstream of this zone, a suspension of the first substance in the liqiuid is formed wherein the first substance has an average particle size between substantially 10 and 150 microns. As a result, the heat-exchange between the suspension and the second substance is improved.

Advantageously, the quantity of the first substance is so regulated that the concentration thereof is between about 1 and 6 volume percent. It is also favorable for the suspension to be conveyed under conditions of turbulent flow, for example, under conditions such that the flow has a corresponding Reynolds Number at least of the order of $10^5$. This may be achieved by conveying the suspension at a flow rate between about 0.5 and 7 meters per second and, preferably, between about 2 and 5 meters per second. It is further of advantage when the second substance is a fluid and flows countercurrent to the suspension in the path, especially if the second substance is conveyed along another path which is concentric with the predetermined path along the zone of the latter arranged for heat-exchange relationship with the second substance. In this connection, it is mentioned that the term "concentric" as used here is meant to include cases such as, for instance, where one of the paths has a coiled or meandering configuration and the other path is arranged thereabout or therein.

The effects of the invention appear to be due to an action of the first substance which reduces or eliminates deposits for example the so called viscous sublayer that might hinder the flow of heat, especially when the above conditions are observed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a diagrammatic representation of an arrangement for the continuous extraction of bauxite exemplary of an arrangement for carrying out the procedure of the invention.

DESCRIPTION OF THE PREFERRED EMBODIMENTS

To illustrate the invention, the invention will be described with reference to a process for the continuous extraction of bauxite. However, it will be explicitly understood that this is not intended to limit the invention in any manner and that the principles of the invention may, in general, find an application in processes and apparatus wherein a flowing fluid undergoes heat-exchange with a substance at a different temperature.

Referring now to the FIGURE, this diagrammatically represents an arrangement for the continuous extraction of bauxite with caustic liquor such as soda lye and the like. Reference numeral 1 identifies a tubular reaction conduit which defines a predetermined or confining path whereas reference numerals 3 and 4 indicate jackets or annular conduits which extend along various portions or zones of the conduit 1. The jackets 3 and 4 are arranged in heat-exhange relationship with the conduit 1 and are concentrically arranged therewith. Although the conduit 1 may be of coiled or meandering configuration in those portions thereof surrounded by the jackets 3 and 4, this is intended to be encompassed within the term "concentric" as used herein. Reference numerals 2 identify pressure-reduction devices and reference numeral 5 indicates a pump such as, for example, a piston-diaphragm pump.

A suspension of bauxite in caustic liquor such as soda lye is introduced into the conduit 1 as indicated by an arrow. The suspension may be at somewhat of an elevated temperature upon introduction into the conduit 1. The pump 5 forces or conveys the suspension along the conduit 1, also as indicated by an arrow. The suspension is under pressure during its passage through the conduit 1, this pressure being in the range of approximately 10 to 200 atmospheres.

It has been found advantageous to convey the suspension through the conduit 1 under conditions of turbulent flow. For this purpose, the pump 5 forces the suspension through the conduit 1 at a flow rate of at least 0.5 meters per second which has been found sufficient to establish and maintain a condition of turbulent flow. Normally, the flow rate of the suspension will be between 0.5 and 7 meters per second and, preferably, flow rate is adjusted so as to be between about 2 and 5 meters per second.

When the suspension passes through that portion of the conduit 1 surrounded by the first of the jackets 3, it is heated by heat-exchange with heated vapors supplied to the jacket 3 from one of the pressure-reduction devices 2 (the flow of vapor from this device 2 into the corresponding jacket 3 being indicated by an arrow). Subsequently, the thus-heated suspension passes through that portion of the conduit 1 surrounded by the second of the jackets 3. Here, it is heated to a higher temperature by heat-exchange with heated vapors supplied to this jacket 3 from the other pressure-reduction device 2 (the flow of vapor from this device 2 into the corresponding jacket 3 again being indicated by an arrow). As will be clear from the arrows entering and leaving the jackets 3, the vapors from the pressure-reduction devices 2 flow through the jackets 3 in a direction countercurrent to the direction of flow of the suspension in the conduit 1. After leaving that portion of the conduit 1 surrounded by the second jacket 3, the suspension flows into that portion of the conduit 1 surrounded by the jacket 4. The jacket 4 is supplied with high-pressure vapor, such as steam, from a suitable source (not shown) and, in the portion of the conduit 1 surrounded by the jacket 4, the suspension is heated to a final temperature which corresponds at least to the decomposition temperature of the bauxite. Again, heating of the suspension is here accomplished by heat-exchange with the vapors admitted into the jacket 4. The final temperature to which the suspension is heated will depend upon the type of bauxite being extracted and may lie between about 200° and 300° C.

After leaving that portion of the conduit 1 surrounded by the jacket 4, the suspension, which now comprises a suspension of red mud in liquid, passes into the pressure-reduction device 2 nearest the downstream end of the conduit 1. Of course, suitable pressure-reducing valves may be provided which, however, are not illustrated for the sake of clarity. The hot vapors from the suspension in this device 2 are introduced into the jacket 3 nearest the downstream end of the conduit 1 and serve to heat the suspension flowing through the conduit 1 as already described. From this pressure-reduction device 2, the suspension then flows into the other pressure-reduction device 2. Again, the vapors from the suspension in this device 2 are admitted into the jacket 3 nearest the upstream end of the conduit 1 and serve for heating the suspension flowing through the conduit 1 in the manner described. From the pressure-reduction device 2 nearest the upstream end of the conduit 1, the suspension is conveyed into a thickener for the separation of red mud. The vapors from the pressure-reduction devices 2 which are admitted into the jackets 3 condense in the latter and the condensed liquid, for example, water, may then be conveyed to a red mud washer for use in washing the red mud. Similarly, the vapor introduced into the jacket 4 condenses therein. The thus-condensed liquid is removed from the jacket 4 and may, if desired, be passed into a power station for reconversion into vapor.

It will be understood that the arrangement may include a plurality of reaction conduits such as the conduit 1. Moreover, it is pointed out that the suspension exiting from the conduit 1, namely, the red mud suspension, could be used, if desired, for additional heating of the suspension flowing through the conduit 1. For example, it is possible to provide another jacket intermediate the jacket 4 and the jacket 3 nearest the downstream end of the conduit 1 and to admit the red mud suspension leaving the conduit 1 directly into this other jacket so as to additionally heat the suspension flowing through the conduit 1 by heat-exchange with the red mud suspension.

In general, the suspension flowing through the conduit 1 may undergo heat-exchange with another suspension or with a liquid or with vapor and it will be appreciated that, under certain circumstances, it might not be necessary for the substance with which the suspension in the conduit 1 undergoes heat-exchange to be a fluid.

As mentioned earlier, one of the important factors which determines the size and, consequently, the cost, of the arrangement of the type under consideration, is the size or surface area of the surfaces over which heat-exchange occurs. In laying out new tubular reaction apparatus of this type, it is the usual practice to calculate the size of the heat-exchange surfaces required for a desired throughput from the physical data of the suspension of fluid which is to be used utilizing known formulas. The validity of the calculations is determined in the completed apparatus by making temperature measurements using water, aluminate liquor or a suspension as the medium in the conduit.

It was already found with the earliest apparatus of the type under consideration that, when water or aluminate liquor were used as the flowing medium in the conduit, the heat transfer values obtained in practice correspond to those calculated theoretically. Surprisingly, however, certain measurements using a suspension as the flowing medium showed that better heat transfer values were obtained when the flowing medium was a suspension than could be foreseen theoretically.

On the basis of this observation, systematic experiments were carried out wherein the parameters concentration of the suspended solids, particle size of the suspended solids and flow rate of the reaction mixture were varied. The results of these experiments confirmed the initial observations and may be summarized as follows:

When the particle size, that is, the average particle size, of the suspended solid is between about 10 and 150 microns, the heat transfer coefficient "a" for the suspension flowing through the conduit is 15 to 20% greater, insofar as a suspended solids concentration between about 1 and 6 volume % is maintained and the Reynolds Number for the turbulent flow of the suspension is at least of the order of $10^5$, than for the case where a flowing, solids-free aluminate liquor of the same concentration is used under the same conditions. As a result, the overall coefficient of the heat transfer "k" is increased by about 5 to 8%. This surprising effect, which is definitely dependent upon the particle size of the suspended solids and which does not occur when the particles have an average particle size outside the aforementioned range, improves the heat-exchange, that is, increases the efficiency of the heat-exchange. With existing installations, this effect permits a greater throughput to be realized and, insofar as installations to be built are concerned, permits these to be built with heat-exchange surfaces of smaller size, thereby decidedly improving the economy of the process. The increase in the heat transfer obtained in accordance with the invention is realized only with installations having tubular reaction conduits and the concomitant high flow rates (high Reynolds Numbers) obtainable therein but not, for example, in a continuous autoclave battery.

According to one embodiment of the invention, it is possible to reintroduce part of the red mud formed in the extraction of bauxite back into the reaction conduit. This is indicated by the arrow 6 in the FIGURE. In any event, the invention provides for forming a suspension having the above characteristics upstream of the portions of the conduit where the heat-exchange occurs.

The effects obtainable in accordance with the invention may be illustrated by the following example: A suspension having a suspended solids concentration between 3 and 6 volume % and wherein the average particle size is 40 microns is passed through a reaction conduit in a tubular reactor installation. On the basis of the selected liquor concentration, the diameter of the reaction conduit and the flow rate, the Reynolds Number has a value of $10^6$. Theoretically, the value of the overall coefficient of heat transfer "k" is calculated to be 2.269 Keal/$m^2 \cdot h \cdot °C$. The measured value is 2.365 Keal/$m^2 \cdot h \cdot °C$. which corresponds to to the increase of more than 4% in the overall coefficient of heat transfer. This, in turn, correponds to the increase of about 15% in the coefficient of heat transfer "a". In contrast, under otherwise identical conditions, practically no increase in the heat transfer values is obtained when the average particle diameter of the suspended solid is 200 microns.

It will be understood that each of the elements described above, or two or more together, may also find a useful application in other types of processes differing from the types described above.

While the invention has been illustrated and described as embodied in a procedure for increasing heat-exchange efficiency, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features which, from the standpoint of prior art, failry constitute essential characterstics of the generic or specific aspects of this invention and, therefore such adaptations should and are intended to be comprehended within the meaning and range of equivalence of the following claims.

What claimed as new and desired to be protected by Letters Patent is set forth in the appended claims:

1. A process for the continuous extraction of bauxite with soda lye, comprising the steps of forming a suspension of particulate bauxite in soda lye wherein the concentration of bauxite is between substantially 1 and 6 volume %, said buaxite having an average particle size between substantially 10 and 150 microns; conveying said suspension along at least one conduit at a pressure between substantially 10 and 200 atmospheres, said suspension being coveyed at a flow rate between substantially 0.5 and 7 meters per second so as to establish and maintain turbulent flow with a corresponding Reynolds Number of the order of $10^5$; and heating said suspension to temperatures between substantially 200° and 300° C. by conveying a heated medium in countercurrent flow to said suspension along another conduit substantially concentrically arranged with and in heat-exchange relationship with said one conduit.

2. A process as defined in claim 1, said extraction causing the formation of red mud; and wherein the step of forming said suspension comprises introducing at least a portion of said red mud into said soda lye.

3. In a process for the continuous extraction of bauxite with caustic liquor such as soda lye wherein the bauxite and liquor are conveyed along a confining path under pressure and heated to a final temperature by heat-exchange with a heated substance, the improvement comprising the step of forming a suspension of said bauxite in said liquor wherein said bauxite has an average particle size between substantially 10 and 150 microns, whereby the efficiency of said heat-exchange is improved.

4. A process as defined in claim 3, wherein the concentration of said bauxite is between subtantially 1 and 6 volume %.

* * * * *